United States Patent [19]

Meisel et al.

[11] Patent Number: 5,054,085
[45] Date of Patent: Oct. 1, 1991

[54] PREPROCESSING SYSTEM FOR SPEECH RECOGNITION

[75] Inventors: William S. Meisel, Encino; W. Andreas Wittenstein, Venice, both of Calif.

[73] Assignee: Speech Systems, Inc., Tarzana, Calif.

[21] Appl. No.: 614,991

[22] Filed: Nov. 19, 1990

Related U.S. Application Data

[63] Continuation of Ser. No. 871,520, Jun. 6, 1986, abandoned, and a continuation-in-part of Ser. No. 928,643, Nov. 5, 1986, Pat. No. 4,718,096, which is a continuation of Ser. No. 698,577, Feb. 6, 1985, abandoned, which is a continuation-in-part of Ser. No. 495,674, May 18, 1983, abandoned.

[51] Int. Cl.$^5$ ............................ G10L 9/04; G10L 5/06
[52] U.S. Cl. .......................................... 381/43; 381/49
[58] Field of Search ........................ 381/29–43, 381/45–50; 364/513.5

[56] References Cited

U.S. PATENT DOCUMENTS

| | | | |
|---|---|---|---|
| 3,649,765 | 3/1972 | Rabiner et al. | 381/50 |
| 3,679,830 | 7/1972 | Uffelman et al. | 381/41 |
| 3,752,929 | 8/1973 | Fletcher | 381/41 |
| 4,039,754 | 8/1977 | Lokerson | 381/41 |
| 4,058,676 | 11/1977 | Wilkes et al. | 381/29 |
| 4,394,538 | 7/1983 | Warren et al. | 381/43 |
| 4,516,259 | 5/1985 | Yato et al. | 381/36 |
| 4,718,096 | 1/1988 | Meisel | 381/43 |

OTHER PUBLICATIONS

Jaschul, "An Approach to Speaker Normalization for Automatic Speech Recognition", IEEE ICASSP 79, Apr. 1979.
Silverman et al., "A Parametrically Controlled Spectral Analysis System for Speech", IEEE Trans., ASSP-22, No. 5, Oct. 1974, pp. 362–381.
Gold et al., "Parallel Processing Techniques for Estimating Pitch Periods of Speech in the Time Domain", The Journal of the Acoustical Society of America, vol. 46, 1969.
Clapper, IBM Technical Disclosure, "Word Recognizers with Filters Automatically Adjusted to Speaker", vol. 13, No. 3, Aug. 1970.
Heisey et al., Journal of the Acoustical Society of America, Abstract: "A Time/Speaker Normalization Technique for Word Verification", vol. 63, No. 1, Spring 1978.
Jaschul, "Speaker Adaption by a Linear Transformation with Optimised Parameters", ICASSP 82, IEEE, vol. 3 of 3, May 1982.
Lea, "Prosodic Aids to Speech Recognition", *Trends in Speech Recognition*, Prentice Hall, 1980, pp. 166–205.
Baker, "A New Time-Domain Analysis of Human Speech and Other Complex Waveforms", Canegie–Mellon Univ., 1975.
Zwicker et al., "Analytical Expressions for Critical–Band Rate and Critical Bandwidth as a Function of Frequency", Journal of the Acoustic Society of America, vol. 68, No. 5, pp. 1523–1525.
Bug, "A New Analysis Technique for Time Series Data", NATO Advanced Study Institute on Signal Processing with Emphasis on Underwater Acoustics, Aug. 12–13, 1968, pp. 42–48.

*Primary Examiner*—Gary V. Harkcom
*Assistant Examiner*—David D. Knepper
*Attorney, Agent, or Firm*—Blakely, Sokoloff, Taylor & Zafman

[57] ABSTRACT

The present invention processes an independent body of speech during an enrollment process and creates a set of speaker specific enrollment parameters for normalizing analysis parameters including the speaker's pitch, the frequency spectrum of the speech as a function of time, and certain measurements of the speech signal in the time-domain. A particular objective of the invention is to make these analysis parameters have the same meaning from speaker to speaker. Thus after the pre-processing performed by this invention, the parameters would look much the same for the same word independent of speaker. In this manner, variations in the speech signal caused by the physical makeup of a speaker's throat, mouth, lips, teeth, and nasal cavity would be, at least in part, reduced by the pre-processing.

10 Claims, 9 Drawing Sheets

PREPROCESSING SYSTEM FOR SPEECH RECOGNITION

This is a continuation of application Ser. No. 871,520 filed 6/86, now abandoned, and a continuation-in-part of Ser. No. 928,643 filed Nov. 5, 1986, now U.S. Pat. No. 4,718,096 which issued Jan. 5, 1988, which is a continuation of Ser. No. 698,577 filed Feb. 6, 1985, now abandoned which is a continuation-in-part of Ser. No. 495,674 filed May 18, 1983, now abandoned.

BACKGROUND OF THE INVENTION

Most existing speech recognition systems pre-process input speech prior to actual processing needed for speech recognition without using knowledge of the speaker. The prior art systems create a spectrum by a number of techniques, such as linear predictive coding, bandpass filtering, transforms (particularly Fast Fourier Transforms), and time domain analysis, such as zero crossing counts. These technologies have varying disadvantages, but are done in a way that does not include any information about the speech characteristics of the speaker and therefore use no speaker-specific parameters which are estimated from an independent body of speech.

Bandpass filters use fixed frequency bands. For example, Lokerson (U.S. Pat. No. 4,039,754) uses three bandpass filters of ranges 336–742 Hz, 574–2226 Hz, and 1750–3710 Hz to correspond to typical ranges of the first, second, and third formants of speech. Thus for example, the second filter in a set of bandpass filters will have a different meaning for a speaker who has a high first formant than for a speaker who has a lower first formant. Since the formants are energy peaks of the speech and depend upon the physical makeup of the speaker, the locations of these energy peaks will vary from speaker to speaker. Therefore, the locations of these frequency peaks will vary from speaker to speaker, and will appear in different bands from one speaker to another.

Further, a set of fixed bandpass filters must have a fixed range of coverage. Therefore, the set must have a minimum band which covers the lowest frequency range that it expects to be able to treat and a maximum band which covers the highest frequency range which it expects to treat. Because this range of values is determined without reference to a specific speaker, some bands will be of minimal, if any, value for any single speaker. This adds noise to the analysis since these bands are not meaningful for the particular speaker and waste system resources.

Linear Predictive Coding (LPC) is a method of approximating the spectrum of a signal by fitting that spectrum with a representation characterized by a fixed number of parameters. For example, a tenth-order LPC implementation might be used in a typical speech processing application, allowing ten parameters to fit to the spectrum over every time interval. A difficulty in utilizing LPC when the recognition technique is based upon typical pattern recognition technology i: that a given LPC coefficient does not have the same meaning from speaker to speaker or even from speech frame to speech frame of the same speaker. For example, the second LPC coefficient may at one time fit one portion of the spectrum and at another time another portion of the spectrum. Thus, it is very difficult to interpret an LPC coefficient as having a specific meaning even when utilized with a single speaker. The variation in LPC coefficients from speaker to speaker is even greater.

Transforms such as Fast Fourier Transforms or Hadamard transforms can be viewed as a series of equally spaced and narrow bandpass filters. The disadvantages of ;sing such transforms are similar to that of bandpass filters, but to some degree magnified because there are more such filters.

Pitch tracking is used in some speech processing systems. Pitch tracking detects the pitch period information that can be used in speech recognition as has been proposed by Lea, *Trends in Speech Recognition,* Prentice Hall, 1980, pp. 166–205. Pitch information can also be used to smooth some of the data by removing the modulation of those parameters by the pitch frequency. Pitch tracking can further be used to "pitch-synchronize" the data so that the data that is utilized in a speech recognition system is a set of parameters for each pitch period rather than for an arbitrary time period.

Pitch tracking for creating pitch-synchronous data is motivated in part by the following logic. The pitch period of a speaker is determined by the characteristics of the speaker's vocal cords. For a given speaker, the pitch period can vary by a factor of four from the lowest to highest pitch period depending upon the sound being spoken, the stress placed upon the word, and the position in the sentence of the word. From speaker to speaker, the average pitch also varies greatly. For example, it is well known that females on the average have a shorter pitch period than males. This variability in pitch makes it impossible to pick a single time period for analyzing the spectrum of the data which always includes exactly one pitch period. Spectral analysis in equal time intervals creates distortion in the spectrum and in some cases averages out information that is important. Further, the amount of data created by a fixed sampling period will be unrelated to the information in the signal. For a low pitch, the spectrum can be calculated less frequently and yet contain all the relevant information in the signal. For a high pitch, the information must typically be sampled more frequently to contain all the relevant information in the signal. This accounts in part for some recognition systems having more difficulty with female voices than with male voices.

Approaches to pitch tracking have varied greatly, but they all suffer from one major defect that seriously reduces their effectiveness. Because they assume no knowledge of the speaker, they must be adaptive or highly general in order to cover the wide range of pitch that can and will be encountered. In attempting to maintain such generality, they are typically either less accurate or more computational, hence slower, than is acceptable.

SUMMARY OF THE INVENTION

The invention disclosed herein is a speech processing method and apparatus which improves the suitability of the parameters of speech derived for speech recognition. While parts of the approach utilized have applicability to other aspects of speech processing, such as speech compression, the purpose of the present invention is to provide a more accurate and cost-effective speech recognition system.

The present invention processes an independent body of speech during an enrollment process and creates a set of parameters representing the speaker's pitch, the frequency spectrum of the speech as a function of time, and certain measurements of the speech signal in the time-domain. A particular objective of the invention is to make these parameters have the same meaning from speaker to speaker. Thus after the pre-processing performed by this invention, the parameters would look much the same for the same word independent of the speaker. In this manner, variations in the speech signal caused by the physical makeup of a speaker's throat, mouth, lips, teeth, and nasal cavity would be, at least in part, reduced by the preprocessing.

The advantage of the speaker normalization created by the pre-processing accrues in several areas. One of these areas is that the parameters have a more consistent interpretation. For example, one of the parameters may be the energy in the first formant (energy peak) of the speech irrespective of the speaker. This consistency of parameters is an important requirement to enable the use of many pattern recognition techniques to their full effectiveness (see Meisel, *Computer-Oriented Approaches to Pattern Recognition,* Academic Press, 1972, p. 26).

Secondly, consistent interpretation of the features allows a more natural use of expert knowledge in discriminating speech sounds. Since a meaning can be attributed to the parameters, an expert can translate his conceptual criteria ("a loud first formant") more directly into a critrion on the parameters ("the first parameter must have a large value").

A third advantage of speaker-normalized parameters is that variations from speaker to speaker are reduced. Thus many people who have the same speech characteristics (e.g., the same physical makeup) will appear nearly identical in the characteristics of their speech after pre-processing into appropriately normalized parameters. In this manner, the number of differences from speaker to speaker that must be handled by a recognition process using normalized parameters is smaller. One can then create a small number of recognizers as a set of tables that are stored in the recognition system, and not have to represent certain types of speaker variation in those tables. This makes it practical to analyze typical speakers "off-line" on a larger computer system and have the results be useful for a large number of speakers whose data was not analyzed, allowing speech recognition with short enrollment periods.

The parameter table which best matches the speaker can be selected during a one-time enrollment process based upon a small amount of data. The number of tables required so that at least one table works well for a given user will depend on the degree of speaker normalization achieved. Since it is the intent of the parameter normalization to remove the variability from speaker to speaker caused by physical differences and speaking habits, the commercial practicability of some types of speech recognition applications is enhanced. Yet a fourth advantage of speaker-normalization is that, by removing speaker-dependent information, the data rate required for the speech representation is reduced, thereby decreasing the computational load on the speech recognizer.

An important class of applications are those which require a large vocabulary, where enrollment of all words in the vocabulary is not practical or advantageous. These applications include general speech-to-text transcription, data base access, and a speech interface to a natural-language or artificial-intelligence program which is text-intensive or highly interactive. The subject invention assumes that a small amount of enrollment speech can be gathered; this will then be extrapolated to the larger vocabulary.

The present invention produces these speech parameters in a form where the amount of data is reduced to that meaningfully required for analysis and where certain artifacts introduced by the pitch modulation of the signal are reduced. In particular, the invention utilizes a pitch smoothing approach which removes the modulation of the spectral and temporal parameters created by the pitch period of the speaker. Further, the invention creates pitch synchronous data, in which there is a set of parameters created for each pitch period rather than for an arbitrary period of time; an arbitrary sampling period could be either too short or too long for a specific speaker.

DETAILED DESCRIPTION OF THE INVENTION

Introduction

Figure 1:
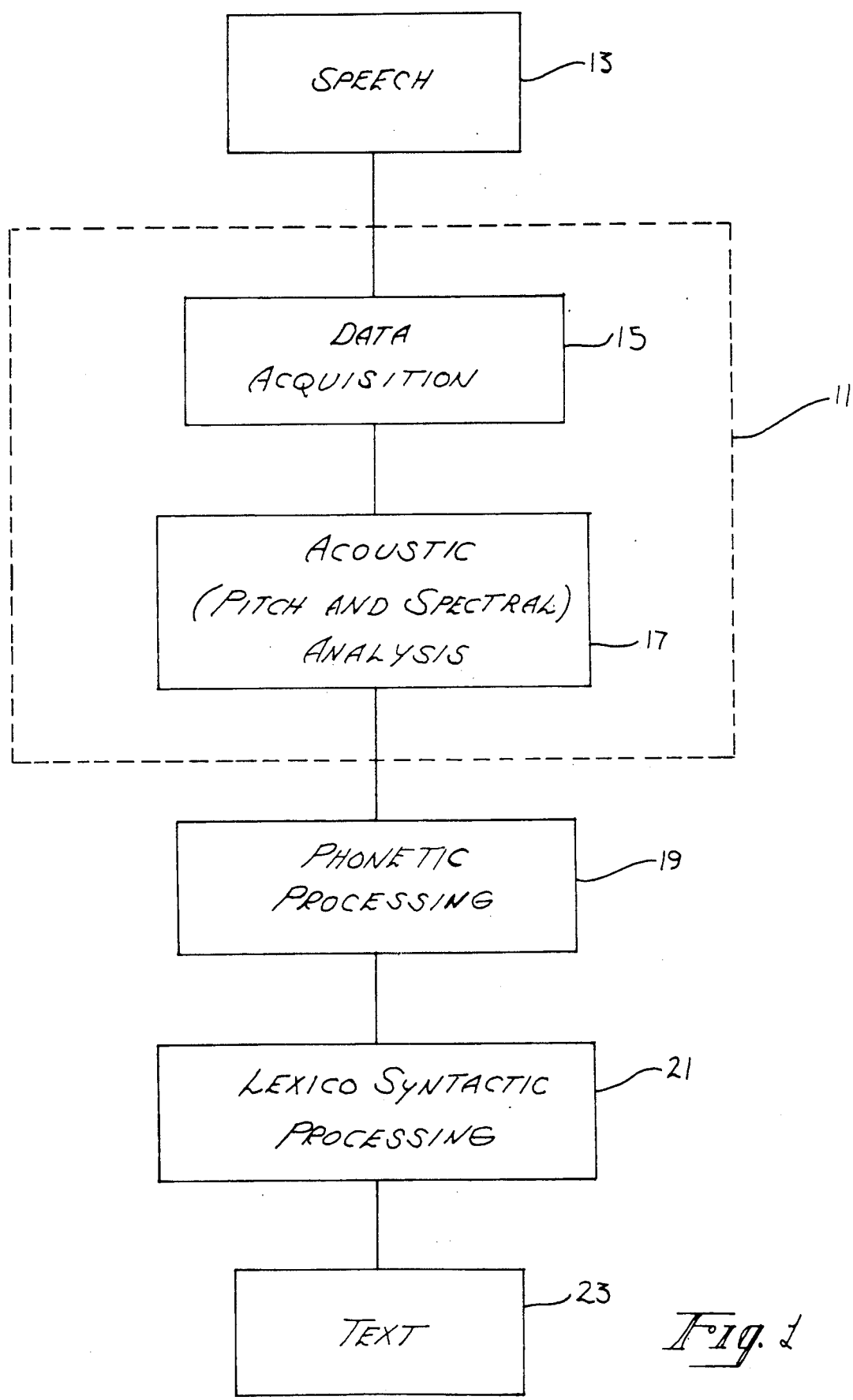
FIG. 1 is a block diagram showing a complete system in which the invented preprocessor is utilized.

A pre-processing system is disclosed which takes a speech signal and produces spectral parameters, temporal parameters, and pitch estimates which are input to a speech recognition module which utilizes the parameters to perform recognition of what was said in the speech. The recognition can be done by template matching or by a number of alternative approaches. By performing the pre-processing as disclosed herein, the recognition problem is made easier for most technologies which might be used in the speech recognition module.

The present invention discloses a pre-processor which provides parameters suitable for accurate speech recognition. In particular, these parameters are produced such that they have the same meaning from speaker to speaker. The subject invention accomplishes this by modifying the pre-processing based upon the specific characteristics of the speaker determined in an enrollment process. Other technologies use fixed pre-processing without regard to speaker. The rest of the speech recognition algorithm must then make up for the irregularities in the interpretation of the parameters.

Enrollment is a process in which a small amount of speech data from the user is used in a one-time (or repeated) analysis to extract user parameters. The analysis can be done off-line; that is, it need not be done in real-time or in the recognizer itself. The data is gathered and then analyzed to create a optimal set of parameters to use in pre-processing for the particular speaker.

A general approach which can be used if the system which does the analysis has a means of buffering the raw analog or digitized speech data is to simply collect and store the raw data. The user parameters can then be extracted by analysis of this data to find the optimal parameters in ways that will be discussed in more detail herein.

In the case where the raw analog data cannot be buffered, it is pre-processed by the system pre-processor. This case requires a different approach. The preprocessor is initially set for a nominal set of values, perhaps characterized by "typical" male or "typical" female. The speech data collected using those nominal values is analyzed in order to extract the correct user-specific parameters. The preferred embodiment uses the second approach.

The speech signal can be normalized to make maximum use of the dynamic range of the system by a variable gain. The gain control can be a simple automatic gain control circuit such as is found in many electronic devices such as portable tape recorders; such a circuit provides short-term dynamic adjustment of the gain. Such gain control algorithms adjust the speech amplitude based upon very short term (less than one-second) time constants; they can distort the speech waveform because of the short-term transients they create. The gain can advantageously be controlled by a more sophisticated algorithm in which a longer term analysis of the speech signal (specifically over an entire sentence) is performed in order to set the gain. This approach is the preferred embodiment. If this latter approach is used, a problem arises with the gain setting for the first few sentences spoken.

An advantage of a speaker enrollment procedure for preprocessing is that initial gain can be chosen during enrollment. Knowledge of the speaker's typical speaking volume minimizes the likelihood of gain-induced errors in the first few sentences spoken.

In the present invention, pitch detection is used in order to remove the pitch modulation. Because the component in the speech signal which represents the pitch is dominant, even with relatively sharp bandpass filters or other frequency analyzers, one will see the pitch component in these signals, sometimes dramatically. Furthermore, due to the radically different resonance characteristics of the vocal tract between the open-glottis and closed-glottis phases of the pitch period, in ordinary frequency analyzers the spectrum shifts up and down each pitch period. By smoothing those signals in a manner so as to take out the amplitude modulation and the frequency shifting imposed by pitch, much more reliable spectral parameters can be estimated.

The spectral parameters can be sampled using the pitch signal as well as to give information at the most relevant rate for the specific individual. This is relatively uncommon in speech recognition, but pitch-synchronous spectrum analysis is a well known approach to speech analysis. See, for example, Rabiner and Schafer, *Digital Processing of Speech Signals,* Prentice-Hall, 1978, pp. 319–323.

Time domain analysis and spectral analysis are usually not utilized within the same system, but in the present invention, such analyses are combined to produce a positive benefit. Typical time domain analyses are zero crossings and amplitude envelope detection, but much more subtle time-domain analyses may be performed. See, for example, Baker, "A New Time-Domain Analysis of Human Speech . . . ", Ph.D Dissertation, Carnegie-Mellon, 1975. Again, pitch information may be used to both smooth and sample the time features.

The sampling of the temporal and spectral parameters allows a reduced data representation of the speech which is geared to the specific speaker. By the specific methods disclosed herein, advantages in spectral analysis, pitch extraction, time domain analysis, gain control, and signal smoothing and sampling are possible.

To perform spectral analysis, as will be discussed in detail below, this invention uses a bank of bandpass filters, realized by digital filters in the preferred embodiment, designed to approximate the spectral characteristics of an auditory critical band, and spaced roughly equally on a critical band scale. (c.f. Zwicker & Terhardt, "Analytical Expressions For Critical-Band Rate And Critical Bandwidth As A Function Of Frequency", *Journal of the Acoustical Society of America* 68(5) pp. 1523–1525). The bandpass filters are implemented as resonators, a recursive form modelling the short-term fading memory of the human auditory system.

A standard practice in speech spectral analysis is to boost the high-frequency components of the signal with a first-order filter in order to compensate for the natural long-term spectral slope of speech. While this invention also pre-emphasizes the speech signal, its design is novel in using a higher-order filter to whiten the signal, thereby compensating for more detailed deviations from a flat spectrum in the long term speech spectrum. Since the average spectrum varies considerably from speaker to speaker, this pre-emphasis filter is adjusted for a specific speaker during enrollment.

The instantaneous magnitude or energy of the output of a recursive filter is traditionally computed by a non-linear, rectifying filter followed by a lowpass smoothing filter. The lowpass filter has the undesirable effect of temporally smearing the filter output with a resultant significant loss in temporal resolution. A novel feature of this invention is in the use of a special rectification process, total energy computation, which yields a smooth but unsmeared magnitude measure and eliminates the need for lowpass filtering. The remaining temporal variations in total magnitude during a pitch period are due entirely to the bandwidth of that frequency band in the signal and to changes in vocal tract configuration.

A fundamental feature of this invention is the automatic tuning of the filterbank to the formant ranges of a particular speaker during enrollment, based on statistical analysis of the output of an untuned filterbank with uniform critical-band spacing, in order to normalize the spectrum, thus reducing the speaker-dependence of the subsequent filterbank output. Finally, the output of the filterbank is parametrized by pitch-synchronous sampling.

To perform pitch detection, as will be discussed in detail below, this invention uses a filter, but one which is unusual in not being a conventional lowpass or bandpass filter designed to approximate a rectangular filter. Since the fundamental frequency range of a single speaker in ordinary speech varies by two octaves, no lowpass or bandpass filter, no matter how rectangular, can reject all the higher harmonics for the highest fundamental in the speaker's range without also admitting at least the second, third, and fourth harmonics for the lowest fundamental in the speaker's range. However, if the fundamental component is only being extracted for period estimation by interpeak interval measurement, the complete suppression of all higher harmonics is unnecessary; the higher components must merely be attenuated to the extent that they are unable to contribute independent peaks to the extracted fundamental signal. In this connection, this invention utilizes a specially designed filter which, rather than attempting to reject all higher harmonics, merely attenuates them to an amplitude relative to the fundamental at which they are incapable of contributing peaks to the signal. This is very advantageous, since a rudimentary peak-picking algorithm then suffices to give an accurate measure of the fundamental period, requiring none of the usual preprocessing by thresholding and correlation, nor any of the postprocessing cleanup familiar to those skilled in the art.

When implemented digitally with a finite word length, this special sloping filter has a frequency range limited by the number of bits in the data word. When this range is too small for the filter to function satisfactorily for the full range of fundamental frequency ranges found across different speakers, it is desirable to have the slope begin at the bottom of the speaker's range. It is likewise desirable to be able to adjust a highpass filter to the bottom of the speaker's range in order to reject sub-pitch phenomena. Hence a novel feature of the invention is the automatic tuning of the filter to the particular speaker, based on automatic statistical analysis during enrollment of the speaker's fundamental frequency as measured with an untuned filter.

A digital implementation also depends critically upon the absolute amplitude range of the signal. If the signal is too high, it will be clipped, causing harmonic distortion which further increases the range in relative amplitude between the fundamental and a higher component; if the signal is too low, it can be lost altogether. This problem is solved in this invention by the use of an automatic gain control system which uses feedback from the digital stage to the analog stage to maintain an optimal signal level before digitization.

Any measure of the local fundamental period, in addition to its intrinsic value as a speech parameter, can also serve an important secondary function as a timing signal for pitch-synchronous parametrization and smoothing of other acoustic variables. For this purpose it is advantageous to know the exact epoch of each pitch period, to prevent blurring the acoustic characteristics of adjacent periods. This invention accomplishes this by using the output of the peak-picker on the pitch-filtered signal to control a pitch-epoch detector on the original (broadband) waveform. Temporal thresholds are employed in the epoch-detector which are, like the pitch filter, automatically tuned to the pitch range of the speaker by statistical analysis of the speech signal during enrollment, thus again minimizing the need for a post-processor to correct the output.

By creating data for recognition which is somewhat speaker independent, better use of system resources is made. Because the algorithms can be tuned to a specific speaker, they can be made more efficient and more accurate at the same time because they do not have to operate in such a way as to be invulnerable to all conditions they might encounter with varying speakers. For example, the pitch algorithm is both more accurate and more efficient because it utilizes knowledge of the pitch range of the specific speaker. The bands created for spectral analysis are all relevant because they are adjusted to the range of the speaker; therefore, bands do not exist which are outside the relevant range of interest for a specific speaker. As a result, in the present invention, system resources used in creating the bandpass parameters are efficiently utilized.

Because of the accuracy of the pitch algorithm, the data rate can be adapted to be pitch synchronous with some confidence. The data is thus adjusted to the specific speaker and at an optimal data rate for that speaker. Since doing this effectively without creating problems requires an accurate pitch algorithm, this is most effectively achieved by the invention disclosed herein whereby the pitch algorithm is adjusted to the specific speaker. Similarly the spectrum and certain time domain features can be smoothed using the pitch information as long as it is accurate. In the sense that the present invention provides a more accurate pitch estimate, this data reduction is made into a practical reality rather than simply a theoretical one.

Preferred Embodiment

Referring to FIG. 1, the invented preprocessing system is shown within shadow lines 11 as part of a speech recognition system including a source of speech (acoustic transducers) 13, a data acquisition section 15, an acoustic analysis section 17 (the data acquisition and acoustic analysis section comprising the invented preprocessor), a phonetic processor section 19, a lexicosyntactic processing section 21 and a text output section 23.

Figure 2:
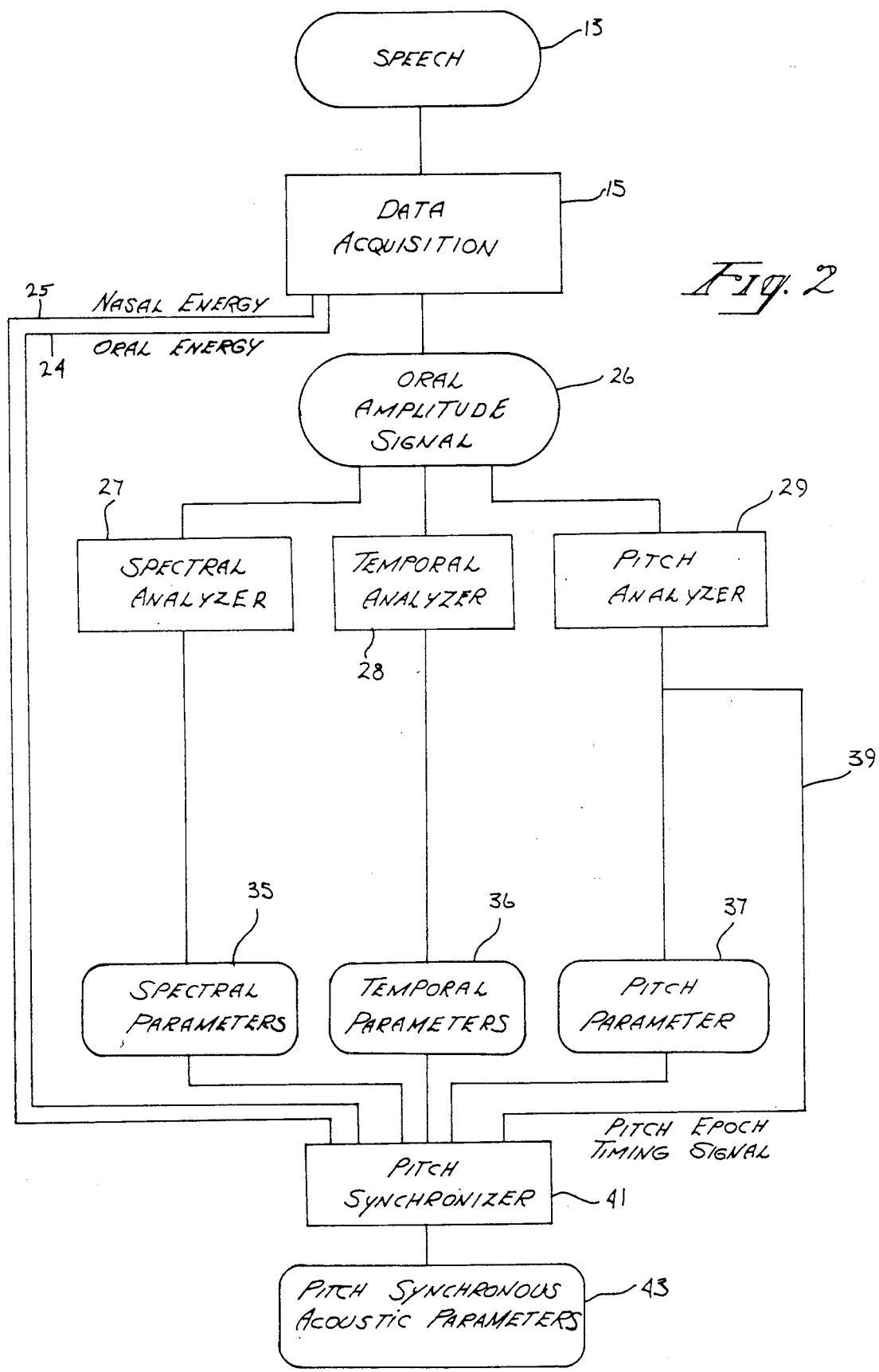
FIG. 2 is a block overview diagram showing the present invention.

The specific elements and the processing performed by the invented preprocessing system may better be explained by reference to FIG. 2 wherein the speech from acoustic transducers 13 is input to data acquisition section 15 which produces digitized speech signals including an oral energy component 24, nasal energy component 25 and oral amplitude component 26. The oral amplitude component of the digitized speech signal is then input into spectral analyzer 27, temporal analyzer 28 and pitch analyzer 29. The spectral analyzer outputs spectral parameters 35. Temporal analyzer 28 outputs temporal parameters 36. Similarly, pitch analyzer 29 outputs pitch parameter 37 and a pitch-epoch timing signal 39. The nasal and oral energy components along with spectral parameters 35, temporal parameters 36, pitch parameter 37, and pitch epoch timing signal 39 are input to a pitch synchronizer 41 as will be described hereinbelow.

Data Acquisition Processing

The details of the data acquisition section 15 will now be described with reference to FIG. 3. Speech which is to be processed by the speech recognition system is converted into an electrical signal by oral microphone 61 and nasal microphone 63 as described more fully in co-pending U.S. application Ser. No. 698,577 filed Feb. 6, 1985 now abandoned, which is the parent of U.S. application Ser. No. 928,643 filed Nov. 5, 1986, now U.S. Pat. No. 4,718,096 which issued Jan. 5, 1988. The electrical signals produced by oral microphone 61 and nasal microphone 63 are input to gain controls 64, 65 and 67 respectively which provide a digitally controlled gain of the input signal providing a resolution of three dB steps for gain controls 65 and 67 and 1.5 dB steps for gain control in a range of 0–40 dB according to the following algorithm:

(a) While taking data (in enrollment or recognition), track is kept of the highest signal level over a pitch period. This level is compared to three thresholds: low, middle, and maximum. Over an utterance, three values are accumulated: the number of times the level was over the maximum threshold, the number of times the level was over the middle threshold but under the maximum threshold, and the number of times the level was over the low threshold but under the middle threshold. These are called overmax, overmiddle, and overlower.

(b) The attenuation is raised, lowered, or held steady based on the relationship between these values and certain frequencies which are high enough (referred to as "max-param") to keep the signal audible and low enough (referred to as "middle-param") to keep the signal from being clipped. The attenuation is changed after each utterance if the following algorithm so indicates.

(c) The attenuation is increased (the gain is decreased) if the attenuation is not already at its maximum and if overlower divided by overmax is less than or equal to max-param. If the attenuation is not increased, it is decreased if the attenuation is not already at its minimum and if overlower divided by overmiddle is greater than middle-param. Otherwise, the attenuation is not changed.

The gain adjusted oral signal is input to band limiting filters 68 and 69. Band limiting filters 68 and 69 are low pass filters whose −1 dB point is 2100 Hz and whose stop band is −36 dB at 3500 Hz. Similarly, the gain adjusted nasal signal is input to band limiting filter 71 which is a low pass filter whose −1 dB point is 2100 Hz and whose stop band is −36 dB at 3500 Hz. The output from band limiting filter 68 is an oral amplitude signal which is the input to Nyquist filter 73 which is a low pass Nyquist filter whose −3 dB point is 5700 Hz and whose stop band is −60 dB at 8 KHz. The maximum differential group delay for Nyquist filter 73 is 1.0 ms from 0 to 6800 Hz.

The outputs from band limiting filters 69 and 71 are voiced band oral amplitude and voiced band nasal amplitude signals respectively which are input to oral energy computation and nasal energy computation circuits 75 and 77 respectively. The oral energy computation and nasal energy computation circuits perform a wide band RMS to DC conversion using, for example, an Analog Devices model No. AD536.

The outputs from the oral energy anl nasal energy computation circuits 75 and 77 are input to Nyquist filters 79 and 81 respectively, each of which is a lowpass Nyquist filter whose −1 dB point is 30.5 Hz and whose stop band is −36 dB at 50 Hz. The maximum differential group delay for Nyquist filters 79 and 81 is 50 ms.

The nasal and oral energy signals output from Nyquist filters 79 and 81 respectively are converted to digital signals by analog to digital converter 83a; the oral amplitude signal output from Nyquist filter 73 is converted to a digital signal by analog-to-digital converter 83b. Analog to digital converter 83a is an 8-bit 200 Hz monotonic converter and analog digital converter 83b is a 14-bit 16 KHz monotonic converter.

Figure 4:
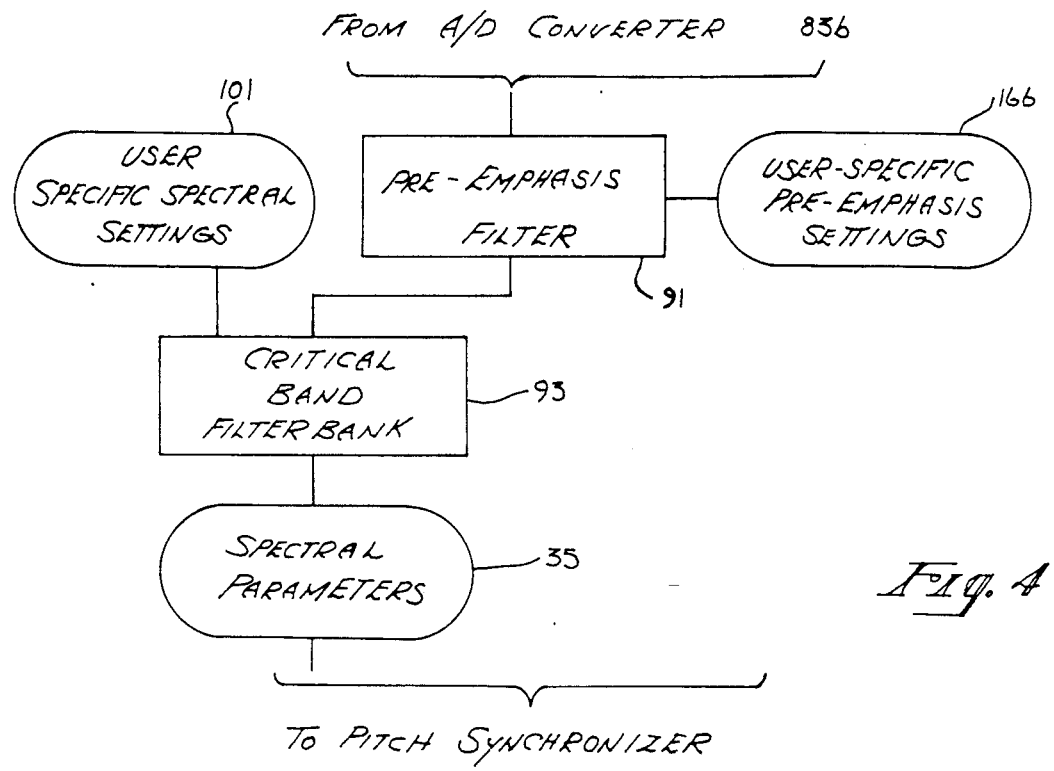
FIG. 4 is a block diagram of the spectral analyzer of the invention.
Figure 6:
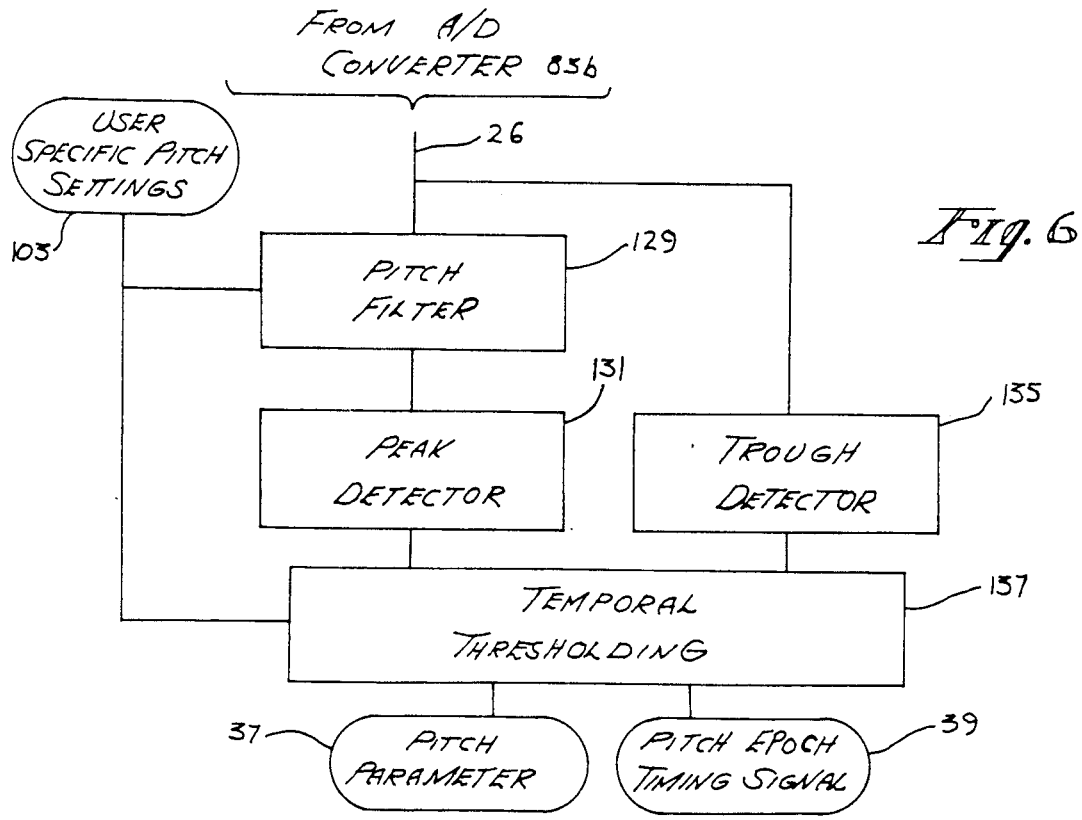
FIG. 6 is a block diagram of the pitch analyzer of the invention.
Figure 5:
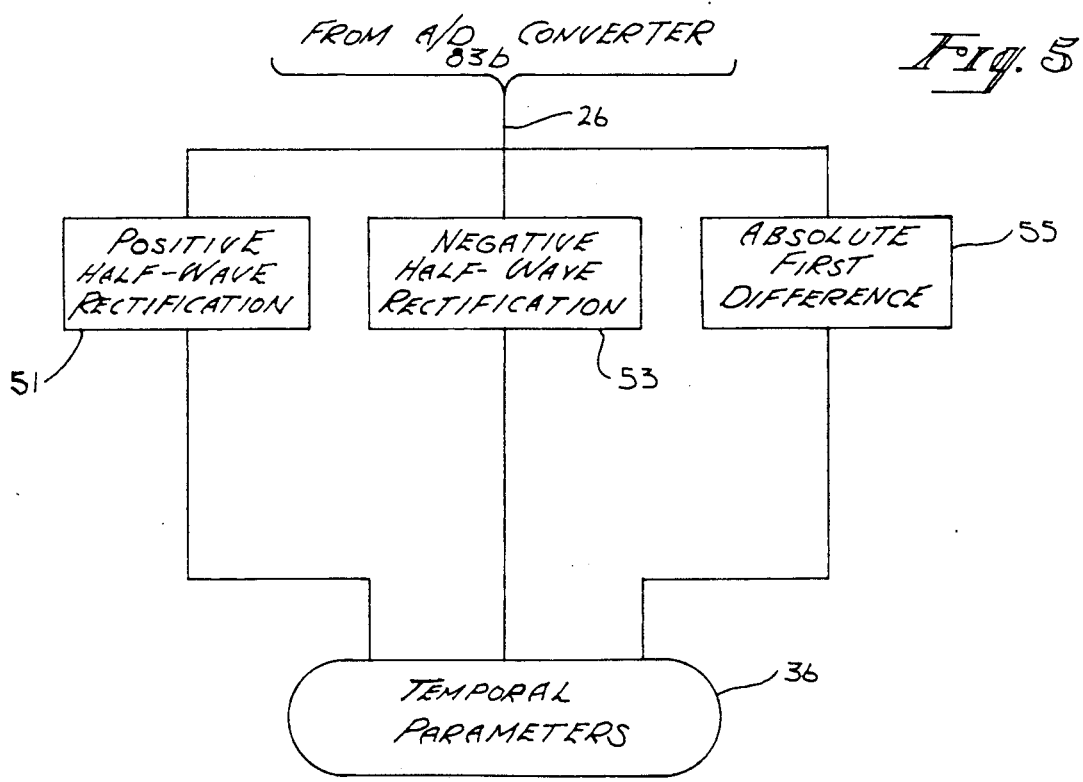
FIG. 5 is a block diagram of the temporal analyzer of the invention.

Spectral, temporal and pitch analysis are performed on the digitized oral amplitude output from analog to digital converter 83b by spectral analyzer 27, temporal analyzer 28 and pitch analyzer 29 as shown in FIGS. 4, 5 and 6 respectively.

Spectral Analysis

In particular, referring first to spectral analyzer 27 as shown in FIG. 4, the output from analog to digital converter 83b is input to pre-emphasis filter 91 which has two second-order zeroes tuned to the inverse of the speaker's long-term speech spectrum, as specified by user-specific pre-emphasis filter coefficients 166. In this manner, the average spectrum of the speaker's speech is whitened, thereby reducing the information rate and normalizing the speaker's spectral characteristics.

The output from pre-emphasis filter 91 is then passed to critical band filterbank 93 which is a set of twenty fourth-order cascaded recursive filters with critical bandwidth equally spaced within three non-overlapping formant regions on a critical band scale. There are seven such filters in each of the first two regions and six filters in the third region. The frequencies and bandwidths of the bandpass filters are determined by user specific spectral settings 101 which are input to the critical band filterbank 93. The frequencies of the filters within each of the three regions are determined from the speaker's formant centroid ranges by spacing the filters equally, on a critical band scale, within each region. The bandwidth of each filter is equal to the critical bandwidth at that frequency. The user specific spectral settings are generated during enrollment in a manner to be described below.

The spectral parameters 35 which are output from critical band filterbank 93 are then input to the pitch synchronizer 41 and processed as described below.

Temporal Analysis

The temporal analyzer 28 will now be described with reference to FIG. 5. The digitized oral amplitude output from analog-to-digital converter 83b is split into three separate signals. Positive half-wave rectification is performed on one of the signals by circuit 51. Negative half-wave rectification is performed on a second of the signals by negative half-wave rectification circuit 53. The value of the absolute first difference of a third of the signals is obtained from absolute first difference signal Circuit 55. The three resulting signals are the temporal parameters 36 which are input to and processed by pitch synchronizer 41 as described below.

Pitch Analysis

Details of pitch analyzer 29 will now be described with reference to FIG. 6. Output from analog to digital converter 83b is also input to pitch filter 129 which is an 18 dB per octave lowpass filter. The pitch filter is implemented as a sixth order cascaded recursive filter utilizing a 16 KHz sampling rate with all (complex conjugate) poles at the speaker's minimum pitch as determined by user specific pitch settings 103. The user specific pitch settings are two values which equal the minimum pitch period threshold and the maximum pitch period threshold of the speaker. The speaker's minimum pitch, to which the pitch filter 129 is tuned, is equal to the reciprocal of the maximum pitch period. The user specific pitch parameters are obtained during enrollment as described below.

The output from pitch filter 129 is then input to peak detector 131 which generates a pulse for peaks found in the input signal by retaining the highest value, and incrementing a counter indicating the distance of the highest peak from the current sample. The digitized oral amplitude signal output from analog to digital converter 83b is also input to trough detector 35 which generates a pulse representing potential pitch period beginnings by retaining the lowest value, and incrementing a counter indicating the distance of the lowest value from the current sample.

Using the pulses generated by peak detector 131, and trough detector 135, and the user specific pitch parameters 103, temporal thresholding is performed by temporal thresholding circuit 137, thereby generating pitch parameter 37 and pitch epoch timing signal 39 as follows.

As noted above, user specific pitch settings 103 are two values which equal the minimum pitch period threshold and the maximum pitch period threshold of the speaker. Using these two values, during each input sample period (i.e., 16000 times a second), if the input from pitch filter 129 is a peak (as determined by the pulse generated by peak detector 131), then if the previous peak was below the minimum pitch period threshold, the present peak is ignored. However, if the present peak is above the minimum pitch period threshold, then the largest trough since the last peak is a pitch epoch and a pulse is generated as pitch epoch timing signal 39. Additionally, if the time since the last peak is greater than the maximum pitch period threshold, then the largest trough which occurred subsequent to the last peak is a pitch epoch and a pulse is generated as pitch epoch timing signal 39.

Once a pitch epoch has been found, peak detector 131 and trough detector 135 are reinitialized, and the number of samples between the present pitch epoch and the last pitch epoch (corresponding to pitch parameter 37) is stored for processing by pitch synchronizer 41.

Pitch Synchronizer

Figure 7:
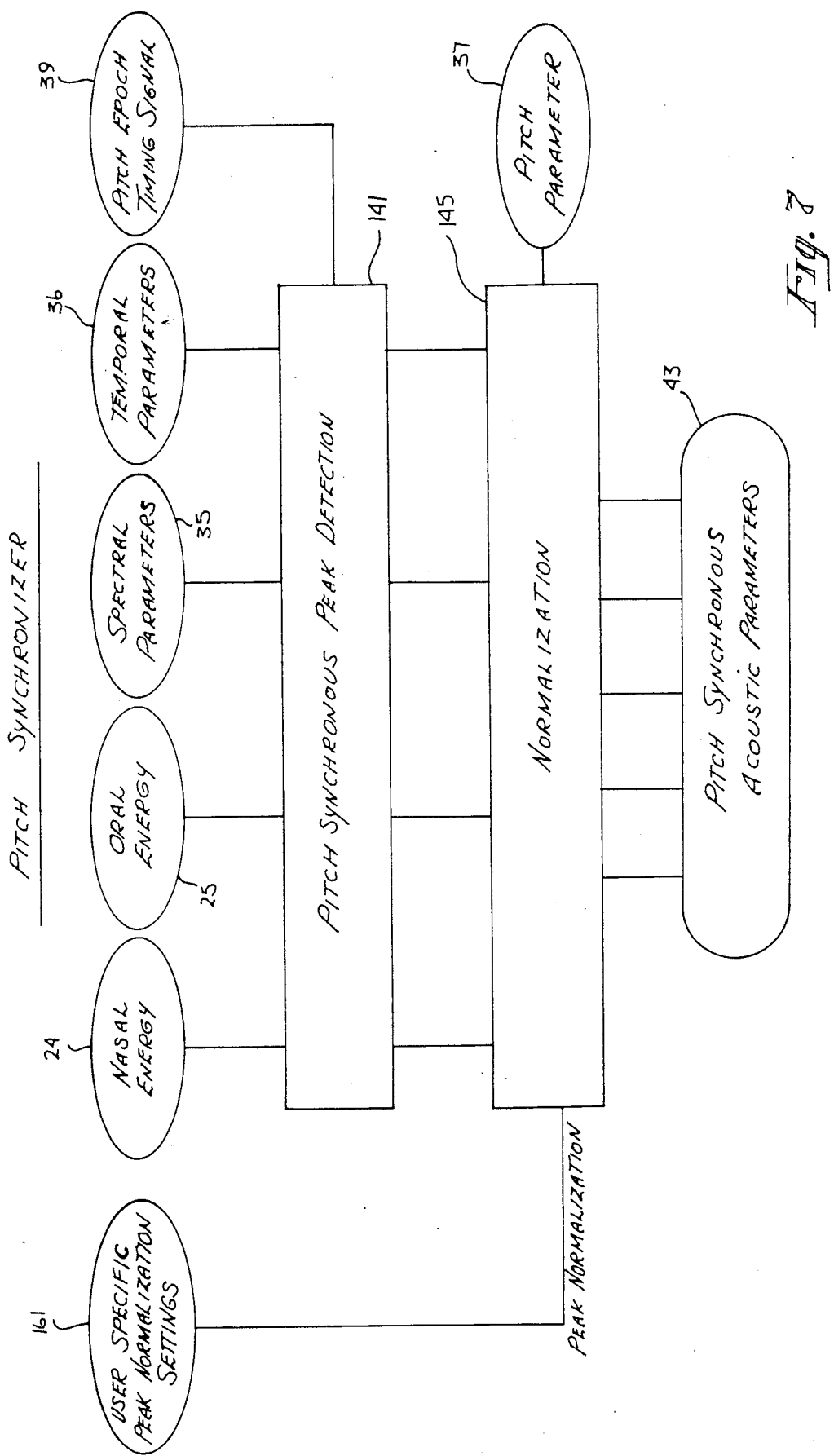
FIG. 7 is a block diagram of the pitch synchronizer of the present invention.

Referring now to FIG. 7, pitch synchronizer 41 comprising pitch synchronous peak detection circuit 141 and normalization circuit 145 will be described.

Pitch synchronous peak detection circuit 141 inputs the nasal energy 24 and oral energy 25 signals from analog-to-digital converter 83a, spectral parameters 35 from spectral analyzer 27, temporal parameters 36 from temporal analyzer 28 and pitch epoch timing signal 39 from pitch analyzer 29. As noted above, the two outputs from analog-to-digital converter 83a are each an 8-bit signal at 200 Hz; spectral parameters 35 are a set of twenty 14-bit signals at 16 KHz divided into three non overlapping formant regions as determined by user specific spectral settings 101; and temporal parameters are a set of three 14-bit, 16 KHz signals at 16 KHz representing a positive half-wave rectification, negative half-wave rectification, and absolute value of the first difference respectively of the 14-bit signal representing oral amplitude.

The four above-mentioned inputs are continuously stored and updated in pitch synchronous peak detector circuit 141 in, for example, RAM memory. The updating process follows. At a pitch epoch, as indicated by a pulse on pitch epoch timing signal 39, the memory is cleared, and during each sample period (i.e. 16000 times a second) the presently stored nasal energy, oral energy, spectral parameter or temporal parameter is updated if the corresponding input value is a maximum for the current pitch period (i.e. between pitch epochs). Upon receipt of a pulse from pitch epoch timing signal 39 indicating the beginning of the next pitch epoch, the stored peak values are sent to normalization circuit 145.

Normalization circuit 145 normalizes the peak values using user-specific peak normalization settings 161 as follows. Each pitch-synchronous peak parameter value, including the nasal energy 24, the oral energy 25, the spectral parameters 35, the temporal parameters 36, and the pitch parameter 37, is adjusted by a linear transformation to normalize the extreme 500th percentiles.

Enrollment

As noted above, much of the processing performed by the invented pre-processor depends upon user specific gain, pre-emphasis, spectral, pitch and peak normalization settings. These settings are generated during an enrollment process for each speaker prior to that speaker utilizing the invented pre-processor.

Gain Enrollment

Figure 3:
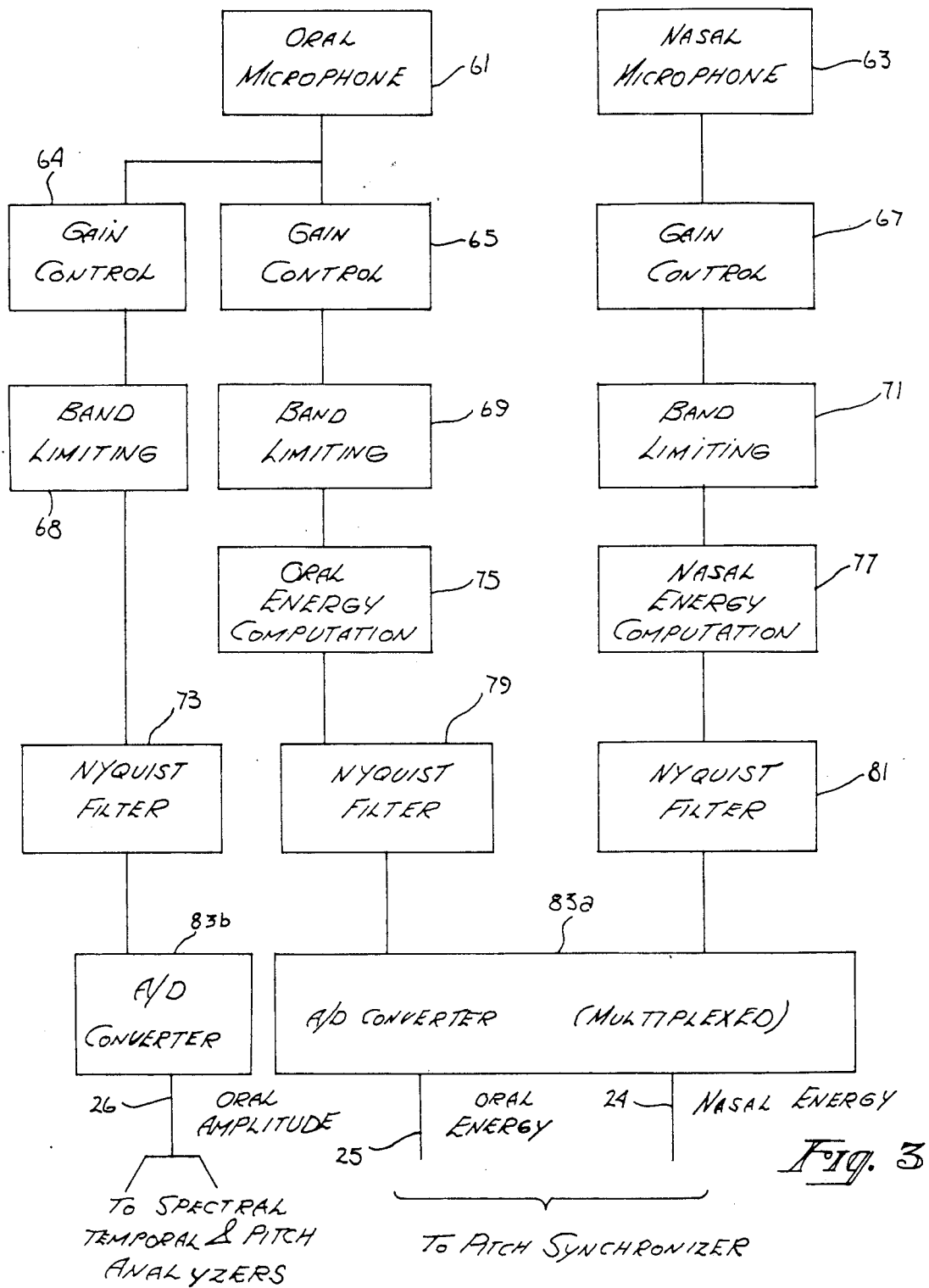
FIG. 3 is a detailed block diagram of the data acquisition processing performed by present invention.
Figure 8:
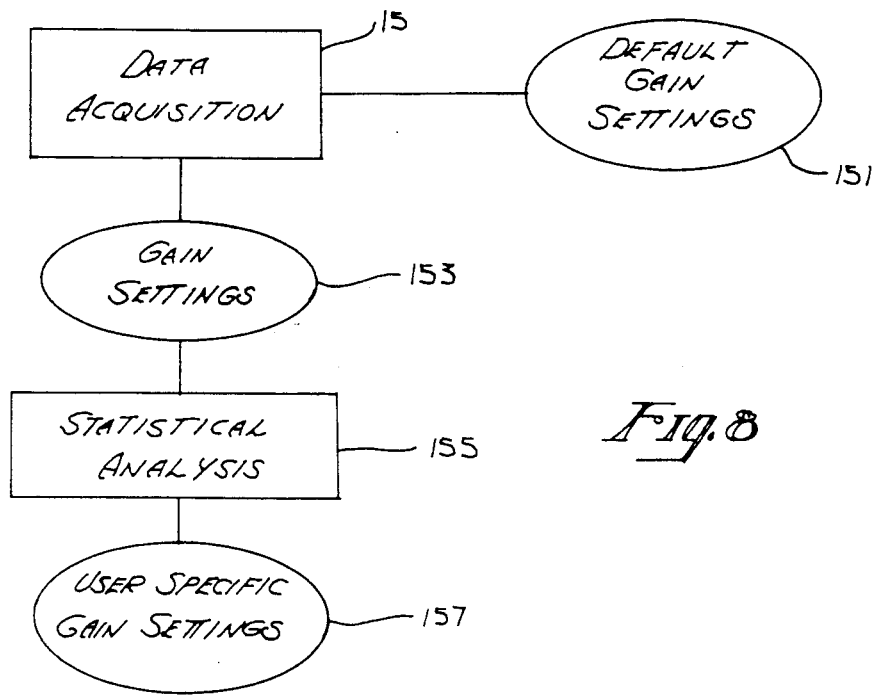
FIG. 8 is a block diagram of the gain enrollment processing performed by the present invention.

Referring first to FIG. 8 and FIG. 3, the user's specific gain settings 157 are obtained as follows. The speaker reads a few sentences which are designed to cause the speaker to utter each of the various speech sounds which may be encountered during normal speech into oral microphone 61 and nasal microphone 63. The choice of sentences for this purpose is not critical; a wide variety of vowel and nasal sounds is preferable. The same data acquisition processing is performed on such input as is described above with reference to FIG. 3, excepting that default gain settings 151 are utilized in the gain control algorithm utilized by gain controls 64, 65 and 67. The default gain settings are chosen to be in the middle of the gain ranges for males, with the setting one gain value lower in each channel for females.

The data acquisition processing described above with reference to FIG. 3 is performed thereby creating gain settings 153 upon which a statistical analysis 155 is performed to produce user specific gain settings 157. The statistical analysis performed on gain settings 153 is as follows. The user is prompted to continue to repeat the gain enrollment sentences until the gain values no longer change of until they move up and down rather than consistently increase or decrease. The enrollment values are the stable values or the median of the varying values once values move up and down.

Pre-emphasis Enrollment

Figure 11:
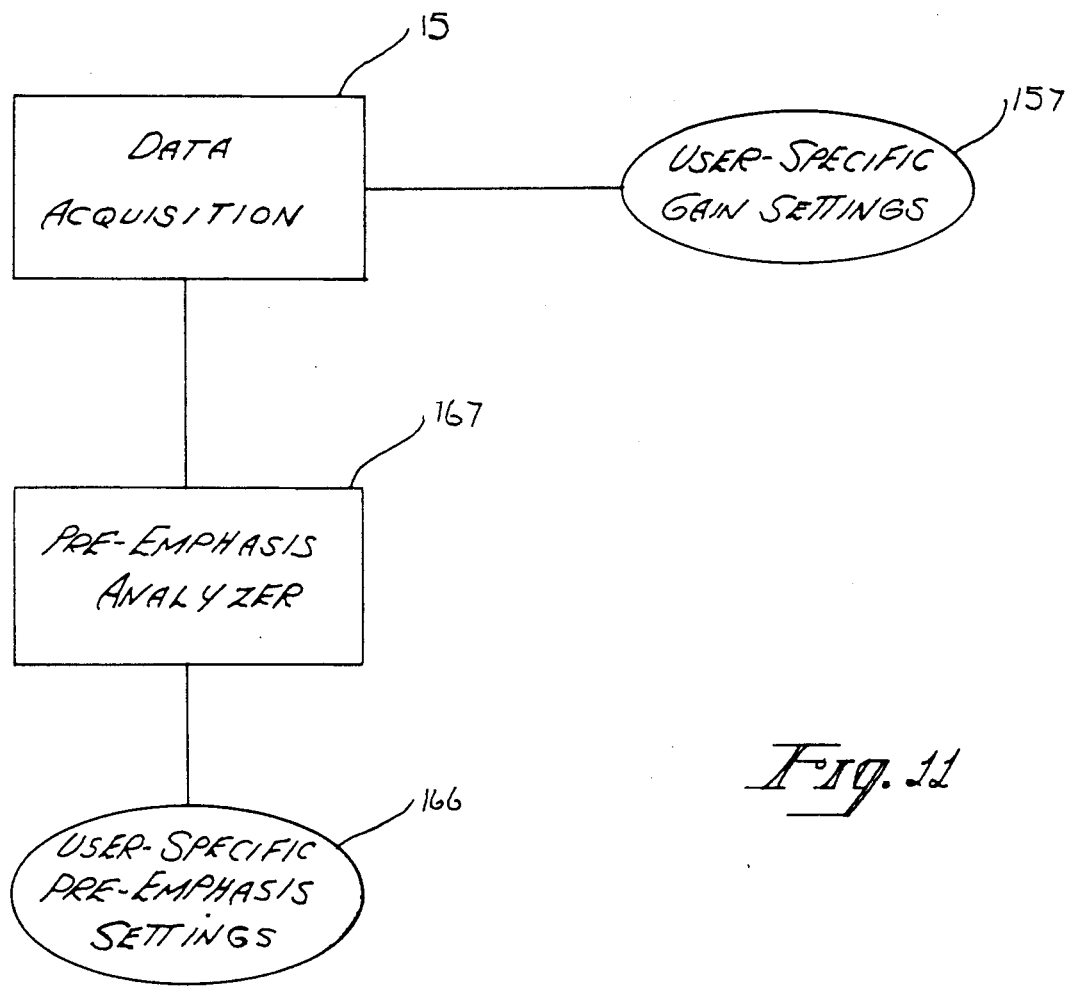
FIG. 11 is a block diagram of the pre-emphasis enrollment performed by the present invention.

Referring now to FIG. 11, user-specific pre-emphasis settings 166 are obtained as follows. Once the user-specific gain settings 157 are obtained during the gain enrollment process, such settings replace the default gain settings 151 used during gain enrollment as described above. The oral amplitude signal 26 output by analog-to-digital converter 83b is analyzed by pre-emphasis statistical analyzer 167 as follows. Using the maximum entropy inverse filter determination method (cf. Burg "A New Analysis Technique for Time Series Data", presented at the NATO Advanced Study Institute on Signal Processing with Emphasis on Underwater Acoustics, Enschede, Netherlands, Aug. 12-23, 1968), a fourth-order inverse filter, as a cascade of two second-order stages, is determined for a long-term sample of the signal. This filter is then used as a pre-emphasis filter for the speaker; its coefficients constitute the user-specific pre-emphasis filter settings 166.

Spectral and Pitch Enrollment

Figure 9:
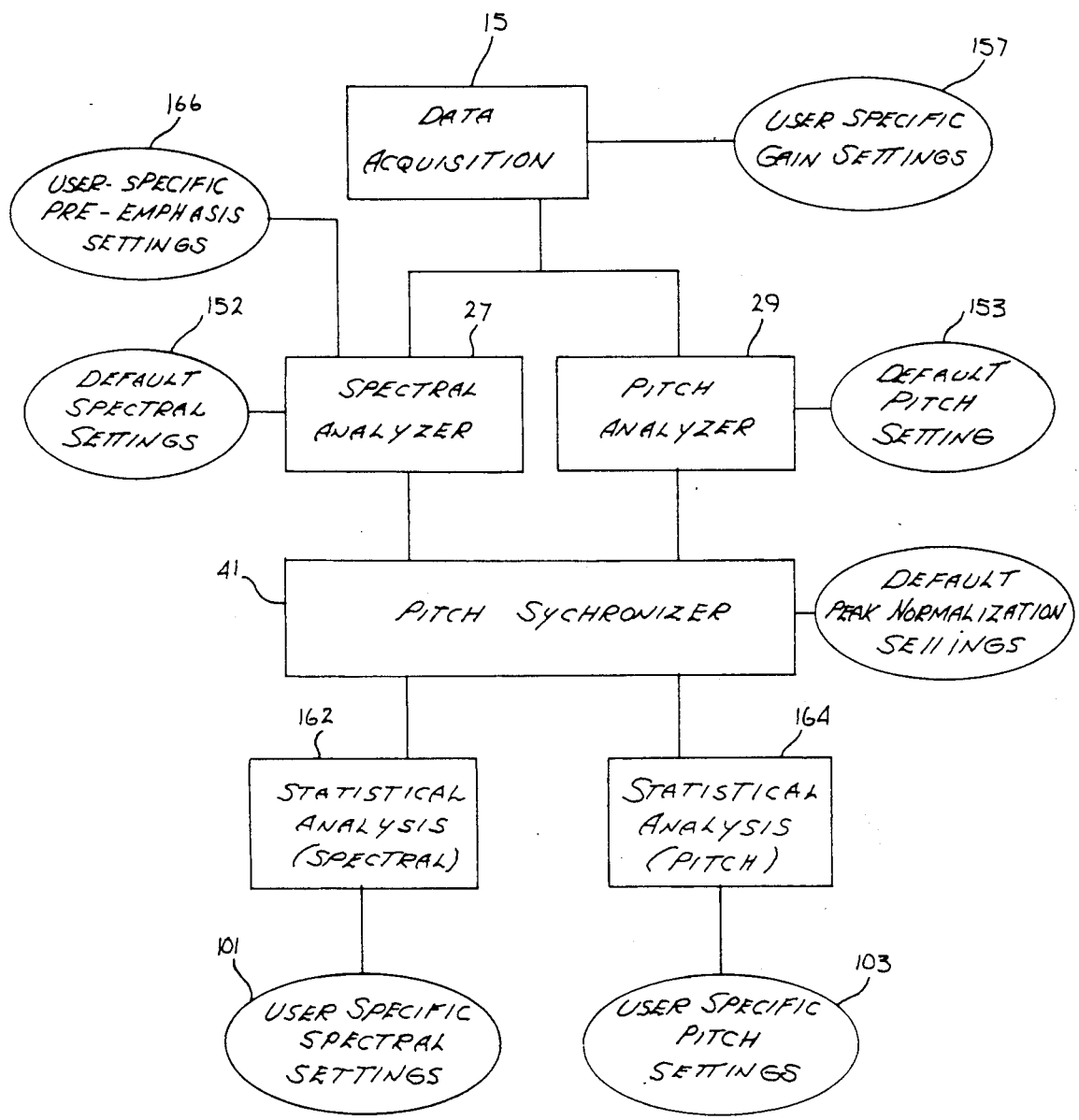
FIG. 9 is a block diagram of the spectral and pitch enrollment performed by the present invention.

Referring now to FIG. 9, user specific spectral settings 101 and user specific pitch settings 103 are obtained as follows. The oral amplitude output by analog-to-digital converter 83b is input to spectral analyzer 27 and pitch analyzer 29. Spectral analyzer 27, as described with reference to FIG. 4, generates spectral parameters 35. The pre-emphasis filter 91 in the spectral processor uses the user-specific pre-emphasis settings derived during pre-emphasis enrollment as described above. However, the spectral analyzer instead of using user specific spectral settings 101 (which are not available at this stage of the enrollment process), uses default spectral settings 152 which are input to critical band filterbank 93. The default spectral settings 152 are standard bark settings (i.e. each pair of adjacent filterbands are one critical bandwidth apart). Similarly, pitch analyzer 29 generates pitch parameter 37 and pitch epoch timing signal 39 as described with reference to FIG. 6, excepting that default pitch settings 153 are input to pitch filter 129 and temporal thresholding circuit 137 instead of user specific pitch settings 103. The default pitch settings 153 are 2.25 to 9 msec for a female voice, and 4.5 to 18 msec for a male voice.

The spectral parameters, pitch parameters and pitch epoch timing signal output from spectral analyzer 27 and pitch analyzer 29 are then input to pitch sychronizer 41. During enrollment, the pitch synchronizer processes the spectral parameters and pitch parameters as described above with reference to FIG. 7, wherein for each pitch period as determined by pitch epoch timing signal 39, the peak spectral parameters are determined by pitch synchronizer detection circuit 41; except, the normalization performed by normalization circuit 145 uses default peak normalization settings 154 instead of user specific peak normalization settings 161. The default peak normalization settings 154 are the upper 200th quantiles averaged over 20 or more speakers for 3 minutes or more of speech per speaker.

Referring back to FIG. 9, the un-normalized peak spectral parameters output from pitch sychronizer 41 are then analyzed by spectral statistical analyzer 162 as follows.

Included in spectral statistical analyzer 162 is a phonetic processor which identifies phones with extreme formant frequencies, namely [i] and [a] for the lowest and highest first formant frequencies and [a] and [i] for the lowest and highest non-overlapping second formant frequencies; and [ʃ] and [s] for the lowest and highest fricative formant frequencies. The extreme quartiles of the formant centrond frequencies of the examples of these sounds are computed to yield measures of the formant frequency ranges. The filters for each formant range are then spaced to exactly cover this region.

Similarly, the un-normalized pitch parameter 37 is then analyzed by pitch statistical analyzer 164 as follows.

The phonetic processor identifies phones with extreme high pitch, namely [i] in sentence-initial stressed syllables. The extreme quartile of the pitch periods of these examples is computed to yield a measure of minimum pitch period. The maximum pitch period is set to four times this quantity.

The statistical analysis performed results in user specific spectral settings 101 and user specific pitch setting 103.

Peak Normalization Enrollment

Figure 10:
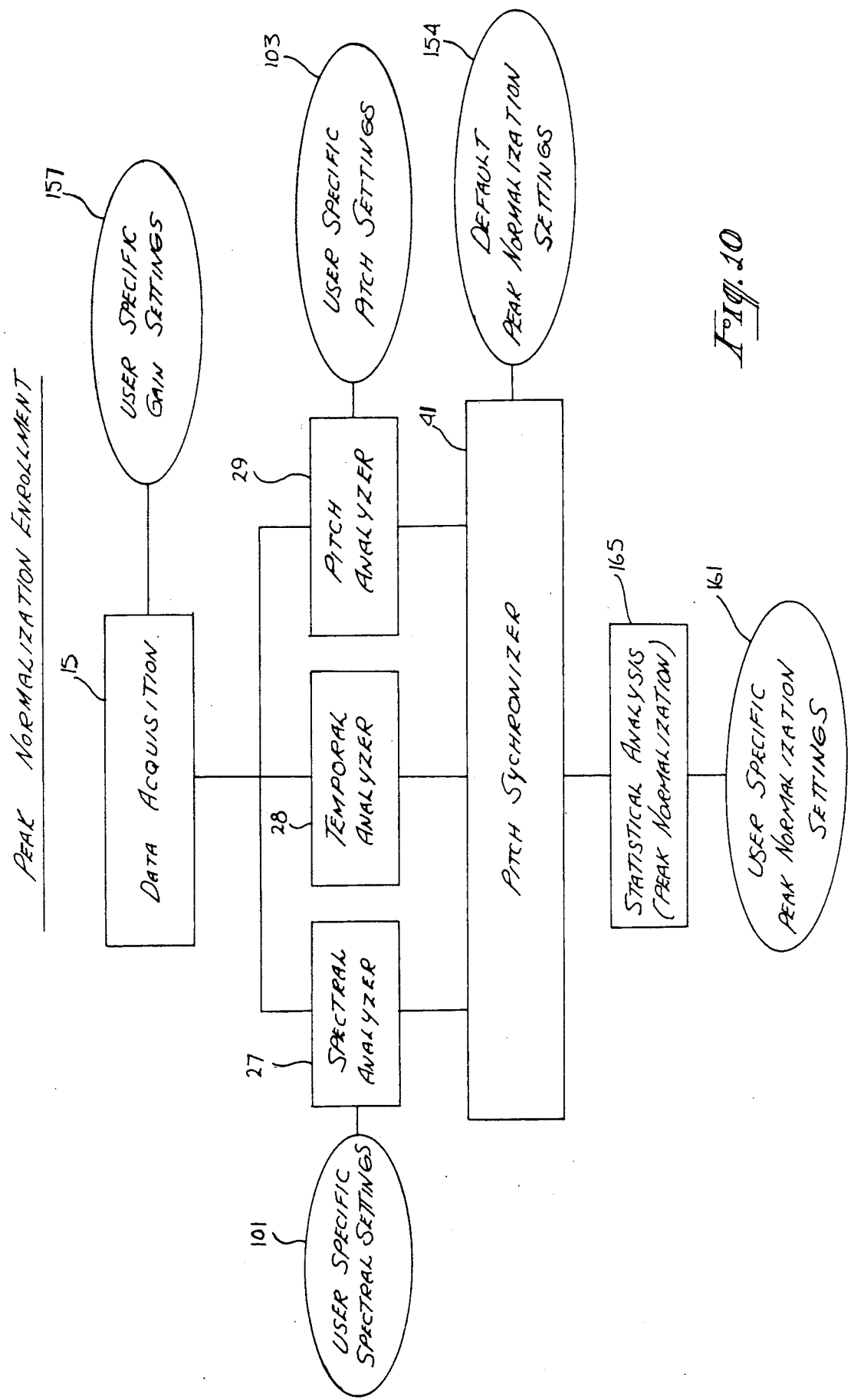
FIG. 10 is a block diagram of the peak normalization enrollment performed by the present invention.

Referring now to FIG. 10, during peak normalization enrollment data acquisition is performed using user specific gain settings 157. Spectral parameters, temporal parameters, the pitch parameter and pitch epoch timing signal are then produced by spectral analyzer 27, temporal analyzer 28 and pitch processor 29 respectively as described above. Of course, inasmuch as user specific spectral settings 101 and user specific pitch settings 103 have already been produced, the respective default settings are no longer needed. The outputs from spectral analyzer 27, temporal analyzer 28 and pitch analyzer 29 are input to pitch sychronizer 41 which selects the peak spectral parameters and peak temporal parameters as described above. User specific normalization settings 161 are then produced by performing peak normalization statistical analysis 165 on such output as follows.

The extreme 1000th quantiles are computed for each pitch-synchronous peak parameter to yield a linear transformation normalizing the speaker's range for each parameter.

Thus, a preprocessing system and method have been described for producing a normalized signal which simplifies the processing required by a speech recognition system or other systems which require the processing of speech signals. Although a particular embodiment has been described, those skilled in the art will recognize that various modifications can be made without departing from the spirit and scope of the invention as defined in the following claims

We claim:

1. A system for preprocessing the speech of a speaker to provide a normalized signal for subsequent processing, said system comprising:

means for generating speaker specific gain settings, speaker specific spectral settings, speaker specific pitch settings and speaker specific peak normalization settings for the speech of a particular speaker, said settings being generated during an enrollment for said particular speaker wherein words spoken during said enrollment may be a different set relative to words spoken by said speaker after said enrollment;

means coupled to said generating means for generating said normalized signal using said settings, which normalized signal represents the speech of the speaker which is to be processed;

wherein said means for generating said speaker specific settings comprises:

a) gain enrollment means for generating said speaker specific settings of the gain for controlling an overall signal level;

b) spectral and pitch enrollment means for generating said speaker specific spectral settings and said speaker specific pitch settings;

c) peak normalization enrollment means for generating said speaker specific peak normalization settings;

wherein said normalized signal includes a set of parameters, said set of parameters including spectral parameters, temporal parameters, pitch parameters, said normalized signal further including a nasal energy signal, an oral energy signal and a pitch epoch timing signal, and wherein said normalized signal generating means includes data acquisition means for generating from the speech of the speaker said oral energy signal, said nasal energy signal and an oral amplitude signal, wherein said oral amplitude signal is input to:

(i) spectral analyzer means for generating said spectral parameters;

(ii) temporal analyzer means for generating said temporal parameters; and (iii) pitch analyzer means for generating said pitch parameters and said pitch epoch timing signal and wherein said data acquisition means comprises:

(a) an oral microphone for converting sound emanating from the speaker's mouth into a first electrical signal;

(b) a nasal microphone for converting sound emanating from the speaker's nose into a second electrical signal;

(c) first gain control means coupled to said oral microphone for producing a digitally controlled gain of said first electrical signal;

(d) second gain control means coupled to said nasal microphone for producing a digitally controlled gain of said second electrical signal;

(e) first band limiting means coupled to said first gain control means for producing a voiced band oral amplitude signal from said gain controlled first electrical signal;

(f) second band limiting means coupled to said second gain control means for producing a voiced band nasal amplitude signal from said gain controlled second electrical signal;

(g) energy computation means coupled to said first and second band limiting means for performing a wide band RMS to DC conversion on the output from each of said first and second band limiting means;

(h) first filter means coupled to said first band limiting means for producing a low pass Nyquist filtered output from said voiced band oral amplitude signal;

(i) second filter means coupled to said energy computation means for producing a low pass Nyquist filtered output from each of said DC converted outputs from said energy computation means;

(j) analog to digital converter means coupled to said first and second filter means for generating a digitalized oral amplitude signal from the output of said first filter means, and a digitalized oral energy signal and a digitalized nasal energy signal from the outputs of said second filter means; and wherein said means for generating said speaker specific settings comprises:

a) gain enrollment means for generating said speaker specific settings of the gain for controlling an overall signal level;

b) spectral and pitch enrollment means for generating said speaker specific spectral settings and said speaker specific pitch settings;

(c) peak normalization enrollment means for generating said speaker specific peak normalization settings.

2. The system defined by claim 1 wherein said spectral analyzer means comprises:

(a) pre-emphasis filter means for emphasizing in said oral amplitude signal frequencies between approximately 600 Hz and 6000 Hz;

(b) critical band filter bank means coupled to said pre-emphasis filter means for separating the output from said pre-emphasis filter means into a plurality of non-overlapping frequency bands based upon said speaker specific spectral settings.

3. The system defined by claim 1 wherein said pitch analyzer means comprises:

(a) pitch filter means for low pass filtering said oral amplitude signal based upon said speaker specific pitch settings;

(b) peak detector means coupled to said pitch filter means for generating a pulse at each peak in said oral amplitude signal;

(c) trough detector means for generating a pulse at each trough in said oral amplitude signal representing potential pitch period beginnings;

(d) temporal thresholding means coupled to said peak detector means and said trough detector means for generating said pitch epoch timing signal based upon the pulses generated by said peak detector means and said trough detector means and said speaker specific pitch settings, said temporal thresholding means also generating said pitch parameters based upon the number of samples which occurred between consecutive pitch epochs.

4. The system defined by claim 1 wherein said temporal analyzer means comprises:

(a) means for generating positive half-wave rectification of said oral amplitude signal, (b) means for generating negative half-wave rectification of said oral amplitude signal;

(c) means for generating an absolute first difference signal of said oral amplitude signal.

5. The system defined by claim 1 further comprising:

(a) pitch synchronous peak detector means for storing during each pitch period the peak sampled values of each of said nasal energy signal, oral energy signal, spectral parameters and temporal parameters;

(b) normalization means coupled to said peak synchronous peak detection means for normalizing the peak sampled values using said speaker specific peak normalization settings.

6. The system defined by claim 1 wherein said speaker specific spectral settings are generated by spectral enrollment means comprising:

data acquisition means for generating from the speech of the speaker an oral amplitude signal, a nasal energy signal and an oral energy signal; spectral analyzer means for generating spectral parameters based upon said oral amplitude signal and predetermined default spectral settings, which generated spectral parameters are stored as said speaker specific spectral settings.

7. The system defined by claim 6 wherein said speaker specific pitch settings are generated by pitch enrollment means comprising:

pitch analyzer means for generating pitch parameters based upon said oral amplitude signal and predetermined default pitch settings, which generated pitch parameters are stored as said speaker specific pitch settings.

8. The system defined by claim 7 wherein said speaker specific peak normalization settings are generated by peak normalization means comprising:

temporal analyzer means for generating temporal parameters based upon said oral amplitude signal; pitch synchronization means coupled to said spectral analyzer means said pitch analyzer means and said temporal analyzer means for generating peak spectral parameters and peak temporal parameters;

means for computing the extreme quantiles of said peak spectral parameters and said peak temporal parameters which coupled values are stored as the speaker specific peak normalization settings.

9. A system for preprocessing the speaker of a speaker to provide a normalized signal for subsequent processing, said system comprising:

means for generating speaker specific gain settings, speaker specific spectral settings, speaker specific pitch settings and speaker specific peak normalization settings for the speech of a particular speaker, said settings being generated during an enrollment for said particular speaker wherein words spoken during said enrollment may be a disjoint set relative to words spoken by said speaker after said enrollment;

means coupled to said generating means for generating said normalized signal using said settings, which normalized signal represents the speech of the speaker which is to be processed, wherein said means for generating said speaker specific settings comprises:
  a) gain enrollment means for generating said speaker specific settings of the gain for controlling an overall signal level;
  b) spectral and pitch enrollment means for generating said speaker specific spectral settings and said speaker specific pitch settings;
  c) peak normalization enrollment means for generating said speaker specific peak normalization settings wherein said speaker gain enrollment means comprises:

data acquisition means for generating gain settings from the speech of the speaker during said enrollment using said speech and predetermined default gain settings; means for performing statistical analysis of said generated gain settings thereby generating said speaker specific gain settings;

wherein said data acquisition means comprises:
  a) an oral microphone for converting sound emanating from the speaker's mouth into a first electrical signal;
  b) a nasal microphone for converting sound emanating from the speaker's nose into a second electrical signal;
  c) first gain control means coupled to said oral microphone for producing a digitally controlled gain of said first electrical signal;
  d) second gain control means coupled to said nasal microphone for producing a digitally controlled gain of said second electrical signal;
  e) first band limiting means coupled to said first gain control means for producing a voiced band oral amplitude signal from said gain controlled first electrical signal;
  f) second band limiting means coupled to said second gain control means for producing a voiced band nasal amplitude signal from said gain controlled second electrical signal;
  g) energy computation means coupled to said first and second band limiting means for performing a wide band RMS to DC conversion on the output from each of said first and second band limiting means;
  h) first filter means coupled to said first band limiting means for producing a low pass Nyquist filtered output from said voiced band oral amplitude signal;
  i) second filter means coupled to said energy computation means for producing a low pass Nyquist filtered output from each of said DC converted outputs from said energy computation means;
  j) analog to digital converter means coupled to said first and second filter means for generating a digitalized oral amplitude signal from the output of said first filter means, and a digitalized oral energy signal and a digitalized nasal energy signal from the outputs of said second filter means.

10. The system defined by claim 9 wherein said statistical analysis means comprises:

means for measuring over time the values of the generated settings until such values stabilize, which stabilized gain settings are stored as the speaker specific gain settings.

* * * * *